United States Patent Office 3,562,236
Patented Feb. 9, 1971

3,562,236
ACETYLENIC METHACRYLATES
Gaetano F. D'Alelio, South Bend, Ind., assignor to Geigy Chemical Corporation, Ardsley, N.Y., a corporation of New York
No Drawing. Filed June 28, 1968, Ser. No. 740,864
Int. Cl. C08f 3/62
U.S. Cl. 260—89.5
10 Claims

ABSTRACT OF THE DISCLOSURE

The compounds disclosed herein are acetylenic methacrylates having the formula $$CH_2=C(CH_3)COO-Z-C\equiv CH$$

wherein Z represents a divalent hydrocarbon radical having at least 2 carbon atoms. Because of their terminal acetylenic radical these compounds are very reactive and capable of producing various acetylenic derivatives. Moreover, the methyl group in the methacrylate portion of the ester gives this compound much greater stability than possessed by the corresponding acrylates. This stability is particularly useful when it is desirable to produce reaction on the acetylenic group but not on the ethylenic. Moreover, the terminal acetylenic makes possible certain reactions which cannot be effected with compounds in which the acetylenic group is not a terminal group. Furthermore the presence of the methyl group in the methacrylate portion of the ester gives sufficient greater polymerization tendency, as compared with the acrylate, that the ethylenic group can be polymerized with less stringent conditions and thereby reduces the tendency for reaction of the anionic initiator with the ester group; the molecular weights and conversions are thereby higher. This increased selectivity of ethylenic polymerization over acetylenic makes it possible to prepare linear homopolymers and thereby to avoid the necessity to resort to copolymeriaztions with monoethylenic compounds such as styrene, and monounsaturated acrylates and methacrylates.

BACKGROUND OF THE INVENTION

Field of the invention

This invention relates to acetylenic methacrylates. More specifically it relates to methacrylates having a terminal acetylenic group capable of reacting to form various derivatives. Still more specifically, it relates to compounds having both ethylenic and acetylenic unsaturation therein, in which the ethylenic unsaturation can be more selectively polymerized under conditions which do not simultaneously stimulate acetylenic polymerization.

Related prior art

Some monomeric acetylenic acrylates and methacrylates and their homopolymers are disclosed in a doctorate thesis submitted in 1965 by Robert C. Evers to the Graduate School of the University of Notre Dame. However, the homopolymers of these are found to have certain disadvantages and are more difficult to control in homopolymerizations and in postreactions because of the high degree of unsaturation in the unpolymerized acetylenic radicals.

However, no polymers are shown of acetylenic methacrylates having four carbons, or more in the acetylenic group and having a terminal acetylene (—C≡CH) group. Propargyl methacrylate homopolymers are shown but these are more inclined to crosslink and have other disadvantages as shown hereinafter. Moreover, copolymers of 1-acryloxy-2-butyne (2-butyne-1-yl acrylate) and 1-methacryloxy-2-butyne (2-butyne-1-yl methacrylate) are shown but these do not have terminal acetylene groups.

STATEMENT OF THE INVENTION

In accordance with the present invention, it has been found that particularly desirable properties are present in compounds having the structure $$CH_2=C(CH_3)COO-Z-C\equiv CH$$

wherein Z is a divalent hydrocarbon radical of at least 2 carbon atoms. Having the terminal acetylenic group separated by a group having at least 2 carbon atoms apparently decreases the activating influence of the COO radical and thus renders this terminal acetylenic group less active with respect to polymerization tendencies. However, this does not reduce its reactivity as a terminal acetylenic group, such as, for example, with regard to replacement of the acetylenic hydrogen. Moreover, having the ethylenic group in the acrylate portion activiated by the presence of the methyl radical gives these particular compounds unexpected selectivity with regard to various derivative formations and with regard to control of homopolymeriaztions as compared to corresponding acetylenic acrylates, and to corresponding esters in which the acetylenic group is not a terminal acetylenic group, and even to corresponding esters in which the acetylenic groups do not have two or more carbon atoms in the group separating the —C≡CH group from the COO radical, such as in the propargyl esters. As described hereinafter the distinctive features of the structure of the terminal acetylenic methacrylates allow more selective reactions both with respect to forming derivatives and in forming homopolymers.

The Z group can be any divalent hydrocarbon group having at least two carbon atoms and preferably one having no more than 10 carbon atoms. It is found that in addition to the distinctions pointed out above, acetylenic groups of four or more carbon atoms give polymer products of improved properties as compared to the corresponding propargyl acrylate polymers, such as greater solubility in lower cost solvents, improved water-resistance, and better ductility and flexibility. Typical Z groups include ethylene, phenylmethylene, methylmethylene (ethylidene), ethylmethylene, cyclohexylmethylene, cycloheptylmethylene, tolylmethylene, benzylmethylene, phenylethylene, trimethylene, pentamethylene, octamethylene, decamethylene, dodecamethylene, phenylene, tolylene, naphthylene, cyclohexylene, cycloheptylene, etc.

While the Z groups listed above do not contain ethylenic unsaturation, such groups containing ethylenic unsaturation can be used, although there is no particular advantage in their use, provided that the unsaturation does not cause premature crosslinking during the preparation of linear homopolymers.

Typical acetylenic methacrylates that can be used are the following: 3-butyne-2-yl, 3-butyne-1-yl, 1-phenyl-3- butyne-1-yl, 1-cyclohexyl-3-butyne-1-yl, 1-benzyl-3-butyne-1-yl, 1-phenethyl-3-butyne-1-yl, 1-cyclophetyl-3-butyne-1-yl, 1-propyl-3-butyne-1-yl, 1-amyl-3-butyne-1-yl, 1-hexyl-3-butyne-1-yl, 2-phenyl-3-butyne-1-yl, 4-pentyne-1-yl, 4-pentyne-2-yl, 4-pentyne-3-yl, 1-phenyl-4-pentyne-1-yl, 1-cyclohexyl-4-pentyne-1-yl, 1-benzyl-4-pentyne-1-yl, 1-phenethyl-4-pentyne-2-yl, 1 - propyl-4-pentyne-3-yl, 5-hexyne-1-yl, 5-hexyne-2-yl, 7-octyne-2-yl, 9-decyne-1-yl, etc., and also p-ethynylphenyl, p-propargylphenyl, p-ethynylbenzyl, 4-ethynylcyclohexyl, 4-ethynylcyohexylmethyl, 4-ethynyl-1-naphthyl, etc.

A number of reactions can be undertaken with the acetylenic methacrylates of this invention, particularly those in which the hydrogen of the terminal acetylenic group is replaced by various other groups. Typical of these are the Mannich reaction, nitrile oxide reaction, the dinitrile oxide reaction, aldehyde and ketone reactions, reaction with sodamide and subsequent replacement of the acetylide sodium with various other groups. In such cases it is possible to prepare corresponding derivatives in which the ethylenic unsaturation is still available for various purposes such as polymerization, including copolymerization, and various addition reactions including promination, decarbonation, etc. In such cases bromine, decarborane, etc., can be added to both the ethylenic and acetylenic groups. Some of these reactions are illustrated as follows:

(1) Mannich reaction:

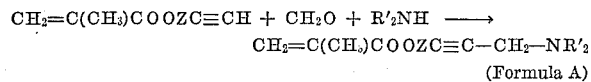

$$CH_2=C(CH_3)COOZC\equiv CH + CH_2O + R'_2NH \longrightarrow$$
$$CH_2=C(CH_3)COOZC\equiv C-CH_2-NR'_2$$
(Formula A)

R' is hydrogen or hydrocarbon such as R''.

(2) Nitrile oxide reaction:

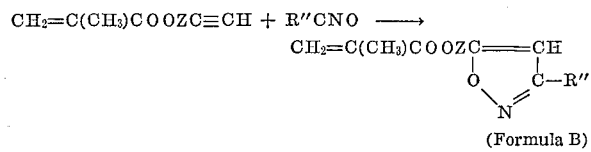

$$CH_2=C(CH_3)COOZC\equiv CH + R''CNO \longrightarrow$$

(Formula B)

R'' is a hydrocarbon group of 1–12 carbon atoms (3) Dinitrile oxide reaction:

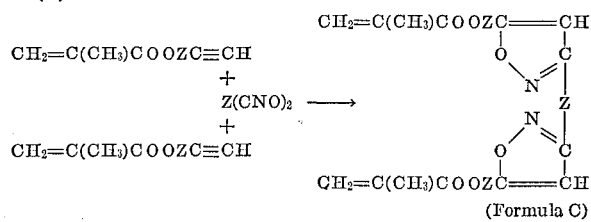

(Formula C)

(4) Aldehyde and ketone reaction:

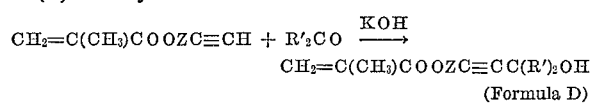

$$CH_2=C(CH_3)COOZC\equiv CH + R'_2CO \xrightarrow{KOH}$$
$$CH_2=C(CH_3)COOZC\equiv CC(R')_2OH$$
(Formula D)

The acetylenic methacrylates of this invention can be prepared by the reaction of methacrylic acid, the anhydride or acid chloride with the appropriate acetylenic alcohol or derivative of the alcohol which will make it available for the esterification reaction. The anhydride reacts easily with alcohol, a mole per mole reacting to give one mole of ester and one mole of methacrylic acid. When the acid chloride is used with an acetylenic alcohol, an acid acceptor is advantageously used such as a tertiary amine. Esterification with methacrylic acid and the acetylenic alcohol generally requires a longer reaction period with removal of by-product water and advantageously an esterification catalyst to promote the reaction.

A good many of the acetylenic alcohols appropriate for preparing the acetylenic methacrylates of this invention are already known. In the case of those not already reported in the literature, various others can be prepared according to well-known methods such as the method described in Organic Synthesis 35, 20 (1955); Chem. Soc. 4633 (1947); Chem Ber. 87, 964 (1956), etc. Thus, the acetylenic alcohol can be prepared from dichloroalkenes. Acetylenic alcohols can also be prepared from alkenols such as 3-buten-1-ol by chlorination in carbon tetrachloride followed by removal of the chlorine from the resulting 1,2-dichlorobutan-1-ol by dropwise addition to a solution of sodamide in liquid ammonia.

The practice of this invention is best illustrated by the following examples. These examples are given merely by way of illustration and are not intended to limit the scope of the invention in any way nor the manner in which the invention can be practiced. Unless specifically indicated otherwise, parts and percentages are given as parts and percentages by weight.

EXAMPLE I

The following preparation of 3-butyn-1-yl methacrylate illustrates the procedure that can be used in making the acetylenic methacrylates from methacrylic acid and the appropriate acetylenic alcohol: Into a round-bottom 3-necked flask fitted with a Dean-Stark trap, a nitrogen inlet, a reflux condenser and a thermometer are placed 70 parts of 3-butyn-1-ol, 86 parts of glacial methacrylic acid, 4 parts of p-toluene sulfonic acid, 0.2 part of p-tert-butyl catechol (as inhibitor) and 120 parts of dry benzene. The reaction mass is placed under a slight nitrogen pressure and refluxed until 18 parts of water is azeotroped over into the Dean-Stark trap. The reaction mass is then neutralized with a saturated sodium carbonate solution and dried over anhydrous sodium carbonate. The sodium carbonate is then filtered off and the benzene stripped off under reduced pressure. Distillation of the residue gives a 65% yield of 3-butyn-1-yl methacrylate which has a boiling point of 111° C. at 65 millimeters. The carbon-hydrogen analyses check closely for the theoretical values for this compound.

The above procedure is repeated successfully a number of times using individually an equivalent amount of various appropriate acetylenic alcohols to produce the following methacrylates: 3-butyn-2-yl; 1-phenyl-3-butyn-1-yl; 1-cyclohexyl-3-butyn-1-yl; 1-benzyl-3-butyn-1-yl; 4-pentyn-1-yl; 1-propyl-4-pentyn-3-yl; 5-hexyne-1-yl; and 7-octyn-2-yl.

EXAMPLE II

The following procedure illustrates a method for preparing the acetylenic methacrylates of this invention from the appropriate acetylenic alcohol and methacrylic chloride. Into equipment similar to that described above except that the flask is also equipped with a dropping funnel there are placed 100 parts of freshly distilled methacrylic chloride and 150 parts of dry benzene. A solution of 67 parts of 4-pentyn-1-ol and 100 parts of triethylamine dissolved in 75 parts of dry benzene is placed in the dropping funnel and added dropwise to the reaction mixture over a period of 1½ hours. Then the reaction mixture is refluxed for 8 hours. At the end of that time the triethyl amine hydrochloride is filtered off and the solution neutralized with saturated sodium bicarbonate solution before drying over anhydrous magnesium sulfate. Then the magnesium sulfate is filtered off, the benzene is stripped off under reduced pressure and the 4-pentyn-1-ol is recovered by distillation in 67% yield. The carbon and hydrogen analyses check closely for the theoretical values.

Similar results are obtained when the above procedure is repeated a number of times using individually in place the 4-pentyn-1-ol the corresponding acetylenic alcohol to produce the following methacrylates: 3-butyn-1 -yl; 1-phenyl-3-butyn-2-yl; 1-phenethyl-4-pentyn-2-yl; 5-hexyn-2-yl; and 1-cyclohexyl-4-pentyn-2-yl.

EXAMPLE III

Mannich reaction (a) Into a round-bottom, 3-necked flask fitted with a mechanical stirrer, a reflux condenser, and a thermometer are placed 0.2 mole of 3-butyn-1-yl methacrylate, 24 parts of diethylamine, 10 parts of paraformaldehyde and 75 parts of dioxane. The reaction mixture is heated on a steam bath with vigorous stirring for 8–24 hours and then subjected to vacuum distillation to recover the product. Analysis shows that the acetylenic groups are still present, that there are also diethylaminomethyl groups present and that the structure corresponds to that shown above by Formula A. This material is found to be suitable as a rust-inhibitor, an interfacial agent, an antifoaming agent and an acid absorber.

(b) Similar results and corresponding products are obtained when the above procedure is repeated using in place of the diethylamine, equivalent amounts of dipropylamine, monopropylamine, dihexylamine, diphenylamine, dicyclohexylamine, dibenzylamine, ditolylamine, monophenylamine, dimethylamine and ammonia except that when ammonia and the volatile amines are used, pressure equipment is used to prevent loss of the ammonia or amine by excessive pressure. Actually, it is found advantageous in such cases to conduct the reaction for a short while at a lower temperature and then gradually raise the temperature to that obtained on a steam bath. In each case corresponding aminomethyl derivatives are obtained.

(c) The procedures of (a) and (b) are repeated a number of times successfully using individually the other acetylenic methacrylates prepared in Examples I and II.

EXAMPLE IV

Reaction with nitrile oxide (a) The procedure of Example III is repeated using in place of the amine and the paraformaldehyde of that example 0.33 mole of phenylnitrile oxide. In each case the reaction product has the structure shown above by Formula B and the compound has a softening point of at least 100° C. above that of the starting acetylenic methacrylate.

(b) Corresponding products are obtained when the phenylnitrile oxide is replaced by an equivalent amount of other nitrile oxides in which the phenyl group is replaced by propyl, amyl, octyl, tolyl, phenethyl, naphthyl, cyclohexyl, methylcycloheptyl and cyclohexylmethyl respectively.

(c) When the procedure of (a) is repeated using an equivalent amount of phenylene nitrile oxide, a disubstituted product is obtained having the structure illustrated by Formula C.

(d) The procedures of (a), (b) and (c) are repeated a number of times with satisfactory results using individually equivalent amounts respectively of the other acetylenic methacrylates prepared in Examples I and II.

EXAMPLE V

Reaction with aldehydes and ketones (a) Into a 3-necked flask equipped with stirrer, reflux condenser, and a thermometer there are placed 0.2 mole of 3-butyn-1-yl methacrylate, 0.33 mole of paraformaldehyde and 75 parts of dry dioxane and 0.25 part of NaOH. The reaction mixture is stirred and heated on a steam bath for 12 hours and then subjected to vacuum distillation for removal of solvent and recovery of the product. Upon testing, the product is found to still have its acetylenic linkage and to have added thereto a methylol group. Analysis identifies the product as having the structure represented above by Formula D.

(b) The procedure of the preceding paragraph is repeated a number of times using individually in place of the paraformaldehyde an equivalent weight of acetaldehyde, benzaldehyde, beta-phenylacetaldehyde and beta-cyclohexylacetaldehyde. In each case the product is found to still have the acetylenic group intact and to have added thereto secondary alcohol groups.

(c) The procedure of the above paragraph (a) is repeated a number of times using individually in place of the paraformaldehyde an equivalent weight of acetone, diphenylketone, diethylketone, methylethylketone and dicyclohexylketone. In each case the product is found to have retained its acetylenic group and to have added thereto tertiary alcohol groups.

EXAMPLE VI

The procedures of paragraphs (a), (b) and (c) of Example V are repeated with similar success using individually equivalent weights of: 3-butyn-2-yl; 1-phenyl-3-butyn-1-yl; 1-cyclohexyl-3-butyn-1-yl; 1-benzyl-3-butyn-1-yl; 4-pentyn-1-yl; 1-propyl-4-pentyn-3-yl; 5-hexyne-1-yl; 7-octyn-2-yl; 1-phenyl-3-butyn-2-yl; 5-hexyn-2-yl; and 1-cyclohexyl-4-pentyn-2-yl.

In attempting to polymerize the acetylenic methacrylates of this invention, the use of free radical-generating activators, such as peroxy compounds, azo compounds, etc. generally result in a substantial degree of polymerization in the acetylenic unsaturation as well as in the ethylenic unsaturation with resultant crosslinking and a high degree of gelation. While a small amount of gellation is permissible, in which case the gell can be separated and the remaining ungelled polymer can be used, it is undesirable to have a high proportion of gelled polymer since it is difficult to post-treat or postreact a polymer in this form. Therefore, the homopolymers of the acetylenic methacrylates of this invention are advantageously prepared by anionic activators which help to make more selective polymerization in the ethylenic unsaturation. Also as pointed out above, the presence of the methyl group in the methacrylate radical likewise helps, as well as the larger hydrocarbon group between the C≡CH and COO groups.

Methods disclosed in the literature for conducting anionic polymerizations are suitable for the purpose of this invention. Suitable anionic polymerization systems are described in D'Alelio U.S. Pats. Nos. 3,203,915 and 3,309,423. Typical anionic activators are also disclosed therein.

For example the anionic polymerization can be initiated by alkali metal hydrides such as NaH, LiH, KH, CsH, including various complexes thereof, such as LiAlH$_4$, etc., alkali metal hydrocarbons, such as the metal alkyls of Li, Na, K, and Cs with the hydrocarbon group being methyl, ethyl, propyl, isopropyl, butyl, amyl, isoamyl, benzyl, triphenylmethyl, phenyl, naphthyl, octyl, etc., preferably containing no more than 12 carbon atoms in a hydrocarbon group.

Also suitable are Grignard reagents having the formula R″MgX, where R″ is a hydrocarbon group as listed above and X is halogen. Typical examples of these are phenyl magnesium bromide, butyl magnesium bromide and chloride, vinyl magnesium bromide, allyl magnesium bromide, etc.

The free alkali metals such as lithium, sodium and potassium can also be used as activators, including combinations of alkali metals and aromatic compounds such as naphthalene, anthracene, α-methyl styrene tetramer, styrene, etc. and liquid ammonia solutions of the alkali metals. Also useful are ketyls which are the reaction products of alkali or alkaline earth metals with ketones, such as benzophenone in ether, for example the sodium reaction product of benzophenone, etc.

Solvents or diluents may be used, if desired, and these can be selected from the class of aliphatic and aromatic hydrocarbons, ketones, ethers, and esters, such as butane, propane, hexane, cycloheptane, octane, benzene, toluene, xylene dimethyl ether, diethyl ether, dibutyl ether, tetrahydrofurane, dioxane, diphenyl ether, dibenzyl ether, dimethyl ethylene glycol ether, dibutyl ethylene glycol ether, diethyl diethylene glycol ether, etc.

The anionic polymerization can be carried out at temperatures ranging from −80° C. to about 80° C. Although the range of −40° C. to 60° C. is advantageous, it is generally more practical to operate in the range of −20° C. to 40° C.

The anionic polymerizations produce linear polymers having a plurality of repeating units of the formula $$-CH_2C(CH_3)- \\ | \\ COOZC\equiv CH$$

EXAMPLE VII

General procedure for anionic polymerization

A 5-necked glass flask is used as the reaction vessel. This is connected with an evacuation means for producing a high-vacuum and fitted with an externally driven magnetic stirrer, one of the side arms of the flask being attached to a 50-ml. round-bottomed flask and also fitted with a stopcock, crowned with a serum cap, and a helium inlet tube. A solution of about 50% acetylenic methacrylate monomer in tetrahydrofurane is stored over calcium hydride in the round-bottom flask for at least 8 hours and then degassed twice at $3\times10^{-6}$ mm. Hg. The reaction vessel is flamed in a stream of helium and then the monomer and solvent are distilled into the reaction vessel. The system is then pressured with helium to slightly above atmospheric pressure and the reaction vessel then cooled to the desired temperature. In most cases, unless otherwise specified, this temperature is −40° C. Then initiator solution, in most cases sodium naphthalene solution is injected volumetrically by means of a hypodermic syringe through the serum cap. The initator to monomer mole ratio is 1:40. The polymerization is allowed to proceed with continued agitation until a noticeable increase in viscosity is observed. The polymerization is terminated by injection of 3 parts of methanol into the solution mixture. The resultant polymers are isolated by precipitation in a non-solvent, redissolved and reprecipitated 3 times in a suitable solvent-nonsolvent system. The polymer solutions are filtered through sintered discs before reprecipitation. Generally, benzene is used as the solvent and heptane as the precipitant. About 0.2% 2,6-di-tert-butyl-p-cresol is used as inhibitor in both solvent and precipitant. The isolated homopolymers are dried to constant weight in a vacuum at about 25° C. The filtrate is evaporated under reduced pressure to isolate hexane-soluble homopolymers.

The procedure of Example VII is used individually with the following monomers to give homopolymers having the repeating unit structures indicated opposite the monomer:

(a) 3-butyn-1-yl methacrylate $$-CH_2C(CH_3)- \\ | \\ COOCH_2CH_2C\equiv CH$$

(b) 3-butyn-2-yl methacrylate $$-CH_2C(CH_3)- \\ | \\ COOCH(CH_3)C\equiv CH$$

(c) 4-pentyn-1-yl methacrylate $$-CH_2C(CH_3)- \\ | \\ COOCH_2CH_2CH_2C\equiv CH$$

(d) 5-hexyn-2-yl methacrylate $$-CH_2C(CH_3)- \\ | \\ COOCH(CH_3)CH_2CH_2C\equiv CH$$

(e) 5-hexyn-1-yl methacrylate $$-CH_2C(CH_3)- \\ | \\ COO(CH_2)_4C\equiv CH$$

(f) 1-phenyl-3-butyn-1-yl methacrylate $$-CH_2C(CH_3)- \\ | \\ COOCH(C_6H_5)CH_2C\equiv CH$$

(g) 1-cyclohexyl-3-butyn-1-yl methacrylate $$-CO_2C(CH_3)- \\ | \\ COOCH(C_6H_{11})CH_2C\equiv CH$$

(h) 1-benzyl-3-butyn-1-yl methacrylate $$-CH_2C(CH_3)- \\ | \\ COOCH(CH_2C_6H_5)CH_2C\equiv CH$$

(i) p-Ethynylphenyl methacrylate $$-CH_2C(CH_3)- \\ | \\ COO-p-C_6H_4C\equiv CH$$

(j) p-Propargylphenyl methacrylate $$-CH_2C(CH_3)- \\ | \\ COO-p-C_6H_4CH_2C\equiv CH$$

(k) 4-ethynylcyclohexyl methacrylate $$-CH_2C(CH_3)- \\ | \\ COO-4-C_6H_{10}C\equiv CH$$

EXAMPLE VIII

Post-bromination of homopolymers

Into a glass-stoppered flask there is placed a solution of 0.6 part of 3-butyn-1-yl methacrylate homopolymer prepared according to Example VII and dissolved in 3 parts of carbon tetrachloride. To this is added twice the theoretical amount of bromine calculated for complete addition to the acetylenic groups in the polymer. The resulting mixture is well agitated to assure thorough mixing and then the flask stoppered and placed in a refrigerator at 0° C. for one week. At the end of this time, 15 parts of heptane is added and the precipitated polymer is isolated by filtration and then redissolved and reprecipitated twice, carbon tetrachloride being used as the solvent and heptane as the precipitant. The resulting polymer has repeating units represented by formulas as given below. When the amount of bromine is not greatly in excess of 1 mole per acetylenic group therein, there are more repeating units of Formula G' and when a considerable excess over 1 mole of bromine is used there are also repeating units of Formula H' and when 2 moles or more of bromine are used, there are more repeating units of Formula H' than of Formula G'.

$$-CH_2C(CH_3)- \qquad\qquad -CH_2C(CH_3)- \\ | \qquad\qquad\qquad\qquad\qquad | \\ COOCH_2CH_2C=CHBr \qquad COOCH_2CH_2CBr_2CHBr_2 \\ | \\ Br$$

(Formula G')        (Formula H')

EXAMPLE VIII

Thermal crosslinking of homopolymer

In this procedure, a 10% solution of a homopolymer made according to the procedure of Example VI is prepared in dry benzene. Samples of the polymer solution are poured onto glass plates and the solvent allowed to evaporate at room temperature. Then the glass plates with the polymer layers thereon are placed in an oven at 120° C. for 8 hours. The resultant films are insoluble in chloroform, carbon disulfide, acetone and dimethylformamide. The crosslinked polymer has crosslinkages as shown below by Formula J.

EXAMPLE IX

Free-radical crosslinking of homopolymers

A 10% solution of polymer made according to Example VI is prepared in benzene. To this solution there is added 0.25 part of benzoyl peroxide per 100 parts of polymer. After thorough mixing, samples of the resultant polymer solution are poured on glass plates and the solvent allowed to evaporate. The plates with the layers thereon are placed in an oven at 100° C. for one hour. Films are thereby formed which are insoluble in benzene, acetone, chloroform and dimethylformamide. The crosslinked polymer has crosslinkages as shown below by Formula J. When this is repeated adding 100 parts of styrene with the benzoyl peroxide per 100 parts of polymer, the resultant crosslinked polymer has crosslinkages as shown below by Formula K.

EXAMPLE X

Postreaction of homopolymer with decaborane

Into a round-bottomed 3-necked flask fitted with a reflux condenser, a mechanical stirrer and a nitrogen inlet, there are added about 0.013 mole of a polymer prepared as in Example VI and 5 parts of decaborane, the amount of decaborane being in excess of the stoichiometric amount. To this mixture there is added 1.8 parts of acetonitrile dissolved in 175 parts of dry toluene together with 0.1 part of ditertiary-butyl-p-cresol as inhibitor. This reaction mixture is refluxed for 84 hours at which time the resulting solution is poured into 350 parts of vigorously stirred heptane. The precipitated polymer is isolated by filtration and washed well with heptane to remove any unreacted decaborane. The product is insoluble in carbon tetrachloride, chloroform, and carbon disulfide but is soluble in toluene and acetone. A toluene solution of the polymer is poured into heptane and the precipitated polymers isolated and then dried in a vacuum at room temperature. The pale yellow product is heated on a Fisher-Johns melting point apparatus and the softening point is recorded. Depending on the degree of reaction the resulting products having repeating units therein represented below by Formula L and M. As in the other postreactions with the homopolymers the posttreated polymers also have some of the original repeating units therein, to the extent that they remain unreacted.

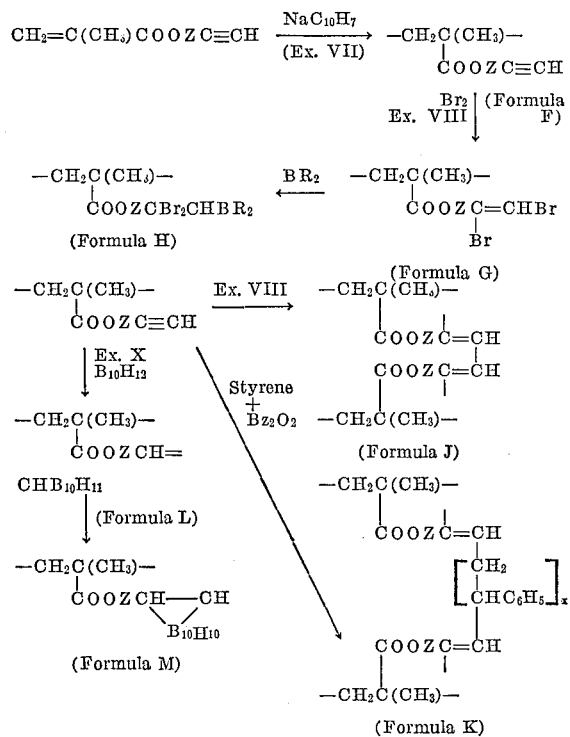

EXAMPLE XI (a) A homopolymer of 3-butyn-1-yl methacrylate is prepared according to the procedure of Example VII, and the polymer is reacted with diethylamine and paraformaldehyde according to the procedure of Example III. The postreacted polymer product is found to have a plurality of repeating units having the formula

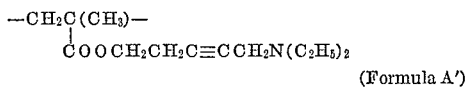

(Formula A′)

and also repeating units of the formula

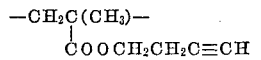

(Formula F′)

to the extent that the original repeating units remain unreacted.

(b) Corresponding results are obtained when the above procedure (a) is repeated using individually equivalent amounts of the following methacrylates as the acetylenic methacrylate: 1-phenyl-3-butyn-1-yl; 1-cyclohexyl-3-butyn-1-yl; 1-benzyl-3-butyn-1-yl; 4-pentyn-1-yl; and 5-hexyn-1-yl.

The postreacted repeating units using $R'_2CO$ as the aldehyde or ketone and $R'_2NH$ as the amine can be represented as

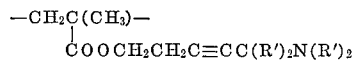

When an aldehyde is used and a secondary amine is used, the repeating units can be represented as

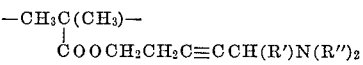

EXAMPLE XII (a) A homopolymer of 3-butyn-1-yl methacrylate is prepared according to the procedure of Example VII, and the polymer is reacted with phenylnitrile oxide according to the procedure of Example IV. The postreacted polymer is found to have a plurality of repeating units having the formula

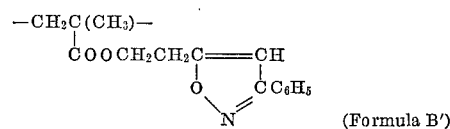

(Formula B′)

and also repeating units of above Formula F′ to the extent that the original repeating units remain unreacted.

(b) Corresponding results are obtained when the above procedure (a) is repeated with the phenylnitrile oxide replaced by an equivalent amount respectively of the corresponding propyl, amyl, octyl, tolyl, phenethyl, naphthyl, cyclohexyl, methylcycloheptyl and cyclohexyl methyl nitrile oxides.

(c) When the procedure of above (a) is repeated using an equivalent amount of phenylene nitrile oxide, a crosslinked product is obtained having a plurality of repeating units having the formula:

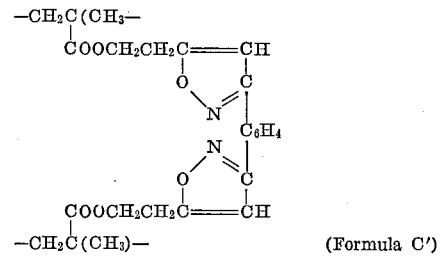

(Formula C′)

(d) When the postreacted products produced above are tested for solubility, it is found that the products of (a) and (b) are soluble in dioxane, acetone, etc., but that the product of (c) is insoluble in such solvents.

(e) Similar results are obtained when the above procedures (a), (b) and (c) are repeated a number of times using the following methacrylates as the acetylenic methacrylates: 1-phenyl-3-butyn-1-yl; 1-cyclohexyl-3-butyn-1-yl; 1-benzyl-3-butyn-1-yl; 4-pentyn-1-yl; and 5-hexyn-1-yl.

EXAMPLE XIII

The procedure of Example V is repeated a number of times using in place of the monomer of that example an equivalent weight of the corresponding homopolymer produced according to the procedure of Example VII. With the paraformaldehyde the postreacted product is found to have a plurality of repeating units of the formula:

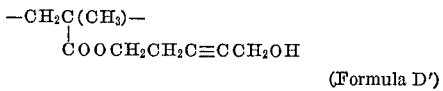

(Formula D′)

With the aldehydes of (b), corresponding secondary alcohol derivatives of the repeating units are obtained, and with the ketones of (c) the corresponding tertiary alcohol derivatives are obtained.

EXAMPLE XIV (a) A homopolymer of 3-butyn-1-yl methacrylate produced by the procedure of Example VII is dissolved or maintained in suspension in liquid ammonia and a solution of sodamide in liquid ammonia or dry dioxane is added thereto in sufficient proportion to provide a very slight excess of one mole of sodamide per acetylenic group in the homopolymer. In place of the sodamide solution, the sodamide can be formed in situ in liquid ammonia by adding small pieces of metallic sodium or pieces of sodium or solid sodamide can be added to a dioxane solution. The reaction is continued for a period of about 2 hours after the desired amount of sodamide or sodium has been added. If ammonia is used, the polymeric metallic derivative is recovered by allowing the ammonia to evaporate gradually and then the precipitate is dissolved in dioxane and the resulting solution is filtered. If dioxane is used as the solvent, the solution is filtered. In either case, heptane is added to the resulting dioxane solution to precipitate the polymer, which is then recovered by filtering. Test of the product shows that the sodium has replaced the hydrogen in the terminal acetylenic groups of the repeating units.

(b) The sodium derivative of (a) is dissolved or suspended in dioxane and reacted with dioxane solutions or suspensions of copper chloride, zinc chloride and cobalt chloride respectively to replace the sodium by the respective other metals.

(c) A butyl radical is added onto the acetylenic group in place of the sodium by adding n-butyl chloride gradually to a dioxane solution of the polymeric sodium acetylide methacrylate. In this case, the butyl group replaces the sodium and sodium chloride is precipitated. The polymeric 4-butyl-3-butyn-1-yl methacrylate product is subsequently recovered by dissolving in ether or dioxane and separating from the precipitated salt by filtration.

(d) Lithium is added to the acetylenic group of the repeating units by substituting butyl lithium for the sodamide used above in paragraph (a). Other lithium alkyls can be used, preferably those having no more than 10 carbon atoms.

The postreacted polymer products of Example XIV have a plurality of repeating units as indicated below in addition to unreacted repeating units of the starting homopolymer:

XIV (a):   —CH₂C(CH₃)—
                |
                COOCH₂CH₂C≡CNa (Formula E′)

XIV (b):— CH₂C(CH₃)—
            |
            COOCH₂CH₂C≡C—MCl (where M is Cu, Zn or Co)

or

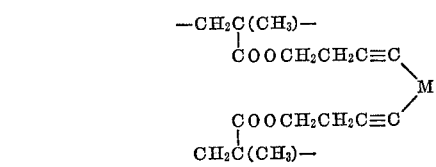

XIV (c):   —CH₂C(CH₃)—
                |
                COOCH₂CH₂C≡CC₄H₉

XIV (d):   —CH₂C(CH₃)—
                |
                COOCH₂CH₂C≡CLi

In addition to producing polymers as described above, the new acetylenic methacrylates of this invention can be used to prepare various derivatives useful as fire retardants, rust inhibitors, interfacial agents, antifoaming agents, acid absorbers, etc. The postreacted polymeric products described herein can be used for similar purposes preferably as modifiers to resin compositions, protective coatings, fibers, etc. The acetylenic methacrylate homopolymers are useful as intermediates in preparing the postreacted polymeric products described herein.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A linear homopolymer having an average polymeric molecular weight of at least 11,040 in which the polymer molecules consist essentially of a plurality of repeating units having the formula

—CH₂C(CH₃)—
    |
    COO—Z—C≡CH wherein Z represents a divalent hydrocarbon radical having 2–10 carbon atoms.

2. A homopolymer of claim 1 in which said repeating units have the formula

—CH₂C(CH₃)—
    |
    COOCH₂CH₂C≡CH

3. A homopolymer of claim 1 in which said repeating units have the formula

—CH₂C(CH₃)—
    |
    COOCH(CH₃)C≡CH

4. A homopolymer of claim 1 in which said repeating units have the formula

—CH₂C(CH₃)—
    |
    COOCH₂CH₂CH₂C≡CH

5. A homopolymer of claim 1 in which said repeating units have the formula

—CH₂C(CH₃)—
    |
    COO(CH₂)₄C≡CH

6. A homopolymer of claim 1 in which said repeating units have the formula

—CH₂C(CH₃)—
    |
    COOCH(CH₃)CH₂CH₂C≡CH

7. A homopolymer of claim 1 in which said repeating units have the formula

—CH₂C(CH₃)—
    |
    COOCH(C₆H₅)CH₂C≡CH

8. A bromine reaction product of claim 1 having a plurality of repeating units of a formula selected from the class consisting of —CH₂C(CH₃)—
    |
    COOZC=CHBr
         |
         Br and —CH₂C(CH₃)—
    |
    COOZCBr₂CHBr₂ wherein Z is as in claim 1.

9. A postreacted product of the homopolymer of claim 1 having a plurality of repeating units therein of the formula

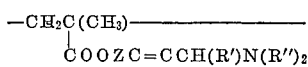

wherein Z is as in claim 1, R″ is a hydrocarbon radical of 1–12 carbon atoms and R′ is hydrogen of R″.

10. A postreacted product of the homopolymer of claim 1 having a plurality of repeating units therein of the formula

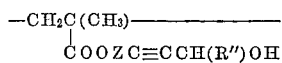

wherein Z is as in claim 1, R″ is a hydrocarbon radical of 1–12 carbon atoms.

References Cited

UNITED STATES PATENTS

| 3,183,216 | 5/1965 | Cohen et al. | 260—89.5 |
| 3,254,115 | 5/1966 | Cohen et al. | 260—486 |
| 3,293,226 | 12/1966 | de Schrijver | 260—96Hal |
| 3,437,688 | 4/1969 | Schwartz | 260—486 |

OTHER REFERENCES

Roberts, Basic Principles of Organic Chemistry, published by W. A. Benjamin, Inc., New York, N.Y. (1964), p. 216.

HARRY WONG, JR., Primary Examiner

U.S. Cl. X.R.

260—30.4, 32.4, 32.8, 33.6, 33.8, 45.7, 66, 67, 80.3, 86.1, 88.3, 486